United States Patent Office 2,992,775
Patented July 18, 1961

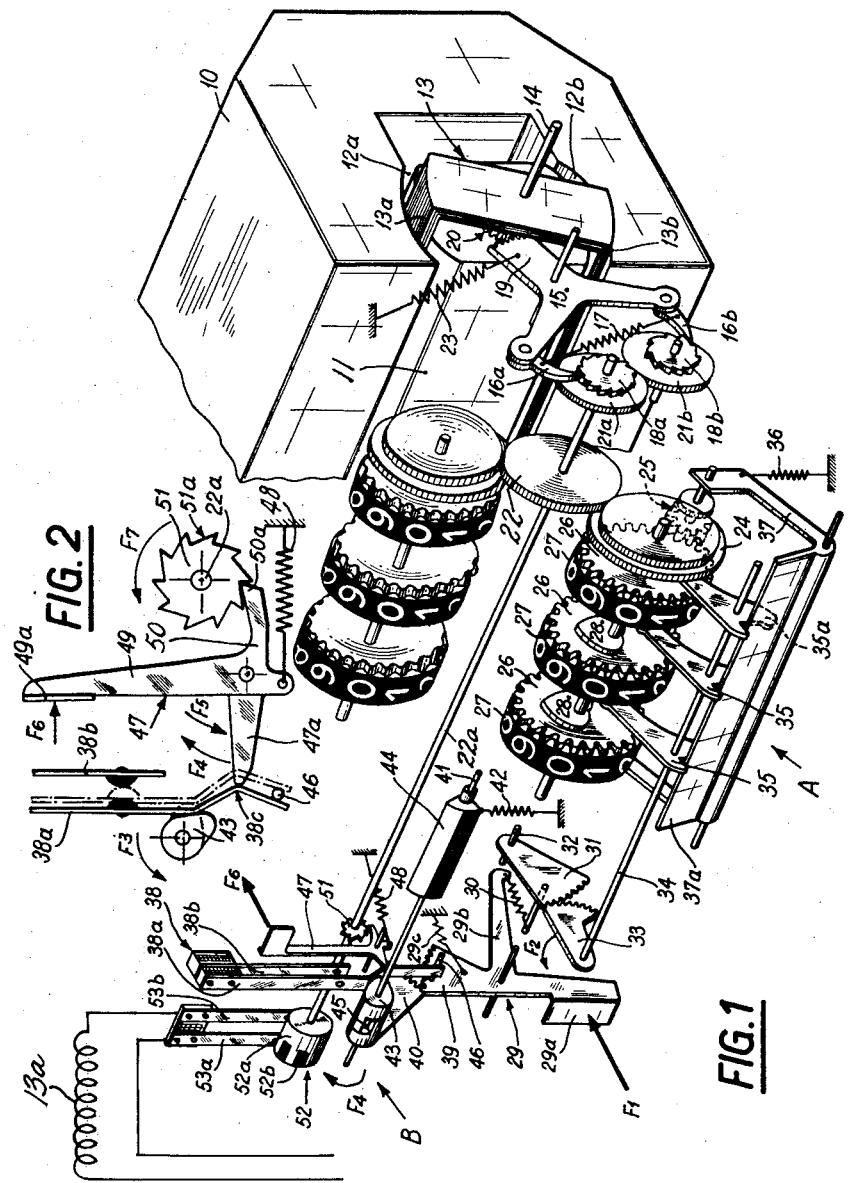

2,992,775
INSTRUMENT FOR TOTALIZING TELEPHONE FEES THROUGH PULSES AT A RHYTHM OF 16 KILOCYCLES
Paul Lüscher, Geneva, Switzerland, assignor to Sodeco Societe des Compteurs de Geneve, Geneva, Switzerland, a Swiss firm
Filed Aug. 7, 1957, Ser. No. 676,894
Claims priority, application Switzerland Aug. 8, 1956
6 Claims. (Cl. 235—92)

The 16 kilocycles pulses used for the indication of telephone fees show the drawback of being considerably damped on the way between the exchange producing them and the indicator instrument at the subscriber's so that the energy available across the terminals of said instrument is not always sufficient for reliably ensuring operation.

It has been attempted to remove this drawback by reducing as much as possible the length of the connecting wires and by amplifying the pulses, for instance through the agency of transistors at the input end of the indicating instrument.

On the other hand, the instruments used at the present time include generally indicating means constituted by a needle and a dial the scale of which is gauged in fee units, the reading of which is not an easy matter.

The present invention has for its object to produce an instrument indicating telephone fees, adapted for use with pulses at a rhythm of 16 kilocycles, which instrument requires no amplifier and allows an easy reading.

The indicating instrument according to the present invention is of the type including a general totalizer and a partial totalizer, each totalizer being constituted by digit-carrying drums and transfer pinions together with a semi-automatically operating mechanism for the return to zero.

According to the invention, said totalizers are actuated by a coil adapted to rock in the magnetic field produced by a permanent magnet against the action of an elastic returning force. Said coil fed through the fee pulses is designed in a manner such that it executes one complete oscillation for each pulse, one half oscillation being produced by an electro-magnetic force arising through the passage of the pulse while the other half oscillation is controlled by the returning force.

Accompanying drawings illustrate by way of example a preferred embodiment of the invention. In said drawings:

FIG. 1 is a diagrammatic perspective view of the instrument.

FIG. 2 is a detail view of a switch forming part of said instrument.

The instrument illustrated includes a permanent magnet 10 with a soft iron armature 11 defining two part cylindrical gaps 12a, 12b which are diametrically opposed and inside which rock the peripheral elements 13a and 13b of a coil 13. The latter which is pivotally secured to a spindle 14 is adapted to be fed with the fee pulses and includes a plurality of rigid convolutions without any carrier frame. The anchor 15 carries pallets constituted by the two catches 16a and 16b which are urged towards each other by a spring 17 so as to engage the teeth of the corresponding ratchet wheels 18a—18b, while the tail piece 19 of said anchor is provided with teeth formed on an arcuate sector and meshing with a toothed wheel 20 coaxially rigid with the coil 13. This arrangement transforms in cooperation with the two toothed wheels 21a and 21b coaxially rigid with the ratchet wheels 18a—18b and engaging each other, the rocking movement of the coil 13 into an intermittent rotary movement which is transmitted to the wheel 22 controlling the totalizers.

The two reciprocations forming one complete oscillation of the coil 13 and which are produced respectively by the electric pulses and by the return spring 23 acting on the anchor provide each for the progression through one half unitary amount of the first digit carrying drum of each of the totalizers, so that each fee pulse may produce a rotation of said drums through one unitary amount corresponding to the interval separating two successive digits. Abutments which are not illustrated limit the amplitude of the oscillations of the coil, so that the operative peripheral elements of the latter may remain continuously and entirely inside the corresponding gaps.

The intermittent rotary movement imparted to the wheel 22 is transmitted on the one hand to the general totalizer which is not illustrated and, on the other hand, through the agency of a conventional mechanism, including the gears 24 and 25 and the wheel 26, to the partial totalizer A. The latter is of the type including digit-carrying drums 27, transfer pinions which are not illustrated and return to zero heart-shaped cams 28. Its return to zero is controlled by a lever 29 of which one arm terminates as a push member 29a which is urged into movement in the direction of the arrow $F_1$. Said lever is rigid with a transverse arm 29b operatively connected through the spring 30 with a toothed sector 31 pivotally secured to a spindle 32 passing through its center, said sector meshing with a second rocking toothed sector 33. The spindle 34 carrying coaxially said sector 33 also carries the return to zero hammers 35. The tail pieces 35a of said hammers hold a blade 37a fast against the action of a spring 36, said blade forming part of a rocker 37 carrying the transfer pinions, so as to hold said rocker in a position for which said transfer pinions engage the wheels 26.

When the push member 29a is depressed, the spring 30 is stretched and remains stretched until it reaches a position of non-stable equilibrium beyond which it is released spontaneously and urges the sectors 31 and 33 upwardly so that the spindle 34 rocks in the direction of the arrow $F_2$. This rocking of the spindle 34 brings the heads of the hammers 35 into engagement with the return to zero cams while it simultaneously releases the rocker 37; the latter under the action of the spring 36 moves away from the totalizer drums, so as to release the transfer pinions with reference to the wheels 36 and to allow the hammers to actually return the digit-carrying drums to zero. When the push member 29a is released, the spring 30 returns the different members of the return to zero system into their orignal position, since the lever 29 is held in position elastically by a stronger spring 29c.

The instrument described includes in addition to the totalizers, the means for actuating same, and the return to zero mechanism, as described hereinabove, a further mechanism B adapted on the one hand to open a switch 38 which short-circuits the call dial of the telephone, whenever the digit-carrying drums are being returned to zero and, on the other hand, to close automatically said switch at the moment of the passage through the coil 13 of the first fee pulse. The circuit closed by the switch 52 is illustrated diagrammatically with a repetition of the showing of the coil 13a while the circuit closed by the switch 38 is adapted to short circuit the call dial C and render it inoperative in a conventional manner as soon as the first fee pulse is received so that it is then impossible to obtain a further connection before the switch 38 is reopened through the return to zero operation as described hereinafter. As to the switch 52, it energizes the coil 13a in an accurately self-adjusting manner. Said switch 52 closes normally the circuit when inoperative, over the contact-making blades 53a and 53b; upon application of the fee pulses and rotation of the coil, the coil circuit remains closed so as to open only during the return movement of the coil during a fraction of said movement and it closes again the circuit at the end of this return motion so as to remain closed again during the inoperative periods separating the two pulses; said mechanism B includes also means for providing manually this latter switch-closing operation.

A toothed section 39 rigid with the lever 29 forms the member of said mechanism which is intended to control the opening of the switch 38 the contact-pieces of which are carried respectively by a folded spring blade 38a and by a rectilinear spring blade 38b.

Said toothed sector 39 meshes with a similar sector 40 fitted loosely over the spindle 41. The latter is subjected to the action of a spring 42 which urges it into a rocking motion in the direction of the arrow $F_3$ (FIG. 2) together with a cam 43 and an indicator shutter 44 also carried by the spindle 41. This sector 40 and the cam 43 are in one with the corresponding driving and driven members respectively of a clutch 45 adapted to provide for the synchronous rotation of said sector and cam during the angular movement of said sector in the direction of the arrow $F_4$ (FIG. 1), opposed to $F_3$, during the return to zero operation.

The sector 39 carries furthermore a pin 46 which in its turn urges during said return to zero operation the switch blade 38a away from the blade 38b so as to allow a nose 47a on the lever 47 subjected to the action of a spring 48 to engage the bend 38c of the blade 38a and to hold the latter through cooperation with the cam 42 in said position.

The switch 38 is closed through the two arms 49 and 50 of the lever 47. The former of said arms is provided with a push member 49a adapted to be depressed when the switch is to be closed by hand while the latter arm cooperates with the teeth 51a of a ratchet wheel 51 keyed to the spindle 22a with a view to providing for the automatic closing of the switch 38 at the moment of the application of the first fee pulse.

The mechanism disclosed operates as follows: when the partial totalizer has been returned to zero through depression of the push member 29a, the sector 39 causes the sector 40 to rock so as to drive the cam 43 in the direction of the arrow $F_4$ through the agency of the clutch 45. During this rocking movement, the cam 43 is shifted from its position illustrated in dot and dash lines in FIG. 2, for which it provided under the action of the spring 42 for the closing of the switch 38, into the position illustrated in solid lines in said FIG. 2.

At the same time, the pin 46 shifts the blade 38a out of its position illustrated in dot and dash lines into the position illustrated in solid lines in said FIG. 2 so as to allow the lever 47 to rock in the direction of the arrow $F_5$ under the action of the spring 48. The lever 47 stops moving at the moment at which the end 50a of its arm 50 abuts against the bottom of the interval separating two teeth 51a of the ratchet wheel 51. For this position of the lever 47, the nose 47a has entered a position slightly beyond the bend 38c so that the action of the cam 43 on the blade 38a and the action of the latter on the nose 47a hold the mechanism in equilibrium without any cooperation of the pin 46 which may be released and is actually withdrawn when the return to zero has been performed and the push member 29a has thereupon been released.

The hand-operated closing of the switch 38 is controlled through action on the blade 49a in the direction of the arrow $F_6$. This hand-operated depression has for its result to make the nose 47a ride over the bend 38c and thus the mechanism is set under nonstable conditions as a consequence of the predominant action of the blade 38a and spring 42 over the action of the spring 48. This predominant action leads to a spontaneous rocking of the lever 47 in the direction of the arrow $F_4$ while the blade 38a returns into its switch-closing position.

The automatic closing of said switch 38 is obtained in a similar manner through the rotation of the wheel 51 the teeth of which are sized in a manner such that it progresses by one tooth interval for each fee pulse.

Thus, the switch 38 being open and the lever 47 occupying the position illustrated in FIG. 2, the first fee pulse which causes the wheel 51 to rock in the direction of the arrow $F_7$ has for its result to provide a rising of the arm 50 which leads as in the case of the hand-operated closing of the switch to a rocking of the lever 47 in the direction of the arrow $F_4$ and to a closing of the switch 38.

The instrument illustrated includes furthermore a rotary switch 52 inserted in the circuit feeding the coil 13; said switch which opens the circuit during the return movements of the coil is constituted by the metal drum 52a, which is fitted on the same shaft 22a as the wheel 22 and is provided adjacent one end with a plurality of short uniformly spaced insulated elements 52b, and by two brushes 53a and 53b sliding respectively over the sections of the drum adjacent the ends of the latter. The breadth of the insulated elements 52b and of the intermediate conductive elements is selected in a manner such that the brushes 53 may be deenergized or energized according as to whether the coil moves under the action of the electromagnetic force generated by the passage of the current pulses or under the action of the return spring 23.

What I claim is:

1. In an instrument totalizing telephone fees through pulses arriving at a rhythm of 16 kilocycles comprising a general totalizer and a partial totalizer each including a plurality of digit-carrying drums and transfer pinions, the provision of a return to zero mechanism for the partial totalizer, hand-operable means controlling same, a coil adapted to rock round its axis, means feeding the pulses to the coil, a permanent field extending in a direction perpendicular to the coil axis to produce an oscillation of the coil in a predetermined direction, an elastic force returning the coil into its starting position after each pulse, a pivoting anchor, a tail piece rigid with said anchor and provided with an arcuate series of teeth coaxial with the pivot of the anchor, a toothed wheel coaxially rigid with the coil and meshing with said teeth on the tail piece, two catches controlled by the successive rocking in both directions of the anchor under the action of the rocking of the coil, ratchet wheels controlled by said catches respectively, interengaging toothed wheels coaxially rigid with the corresponding ratchet wheels, and a gearing operatively connecting one of said interengaging wheels with the totalizers.

2. In an instrument totalizing telephone fees through pulses arriving at a rhythm of 16 kilocycles comprising a general totalizer and a partial totalizer each including a plurality of digit-carrying drums and transfer pinions, the provision of a return to zero mechanism for the partial totalizer, a control lever adapted to be pivotally secured round an axis parallel with the axis of the drums, and including a manually operable push member, two interengaging toothed sectors pivotally secured round axes parallel with the pivotal axis of the lever, a spring interconnecting a point of the control lever with a point of one of the toothed sectors and adapted to be shifted between two stable operative positions through a nonstable position of equilibrium, means wherethrough said spring when urged out of one of said extreme positions by a depression of the push member and reaching its other extreme position shifts the transfer pinions out of engagement and operates the return to zero mechanism for the partial totalizer, a coil adapted to rock round its axis, means feeding the pulses to the coil, a permanent field extending in a direction perpendicular to the coil axis to produce an oscillation of the coil in a predetermined direction, an elastic force returning the coil into its starting position after each pulse, and means wherethrough the rocking of the coil produces a stepwise progression of the totalizer.

3. In an instrument totalizing telephone fees on a telephone provided with a call dial through pulses arriving at a rhythm of 16 kilocycles comprising a general totalizer and a partial totalizer each including a plurality of digit-carrying drums and transfer pinions, the provision of a return to zero mechanism for the partial totalizer, a control lever adapted to be pivotally secured round an axis parallel with the axis of the drums of the partial totalizer and including a manually operable push member, two interengaging toothed sectors pivotally secured round axes parallel with the pivotal axis of the lever, a spring interconnecting a point of the control lever with a point of one of the toothed sectors and adapted to be shifted between two stable operative positions through a nonstable position of equilibrium, means wherethrough said spring when urged out of one of said extreme positions by a depression of the push member and reaching its other extreme position shifts the transfer pinions out of engagement and operates the return to zero mechanism for the partial totalizer, a third toothed sector rigid with the control lever and extending in a plane perpendicular to the pivotal axis of the latter, a fourth toothed sector cooperating with last mentioned third toothed sector, a pivot for said fourth sector, a clutch controlled by the rocking of last mentioned sector round its pivot upon depression of the push member, a cam controlled by said clutch, a pin rigid with the third toothed sector, a circuit short circuiting the call dial, a switch in said circuit controlled in opposite directions by said pin and by said cam to open said switch upon depression of the push member on the control lever, a coil adapted to rock round its axis, means feeding the pulses to the coil, a permanent field extending in a direction perpendicular to the coil axis to produce an oscillation of the coil in a predetermined direction, an elastic force returning the coil into its starting position after each pulse, and means wherethrough the rocking of the coil produces a stepwise progression of the totalizer.

4. In an instrument totalizing telephone fees on a telephone provided with a call dial through pulses arriving at a rhythm of 16 kilocycles comprising a general totalizer and a partial totalizer each including a plurality of digit-carrying drums and transfer pinions, the provision of a return to zero mechanism for the partial totalizer, a control lever adapted to be pivotally secured round an axis parallel with the axis of the drums, and including a manually operable push member, two interengaging toothed sectors pivotally secured round axes parallel with the pivotal axis of the lever, a spring interconnecting a point of the control lever with a point of one of the toothed sectors and adapted to be shifted between two stable operative positions through a nonstable position of equilibrium, means wherethrough said spring when urged out of one of said extreme positions by a depression of the push member and reaching its other extreme position shifts the transfer pinions out of engagement and operates the return to zero mechanism for the partial totalizer, a third toothed sector rigid with the control lever and extending in a plane perpendicular to the pivotal axis of the latter, a fourth toothed sector cooperating with last mentioned third toothed sector, a pivot for said fourth sector, a clutch controlled by the rocking of last mentioned sector round its pivot upon depression of the push member, a cam controlled by said clutch, a pin rigid with the third toothed sector, a circuit short circuiting the call dial, a switch in said circuit controlled in opposite directions by said pin and by said cam to open said switch upon depression of the push member on the control lever, a further lever controlling last mentioned switch and adapted to be controlled by hand, a ratchet wheel adapted to progress stepwise to thereby control said further lever, a coil adapted to rock round its axis, to thereby control the stepwise progression of the ratchet wheel, a circuit feeding the pulses to the coil to energize same, a permanent field extending in a direction perpendicular to the coil axis to produce an oscillation of the coil in a predetermined direction, an elastic force returning the coil into its starting position after each pulse, and means wherethrough the rocking of the coil produces a stepwise progression of the totalizers.

5. In an instrument totalizing telephone fees through pulses arriving at a rhythm of 16 kilocycles comprising a general totalizer and a partial totalizer each including a plurality of digit-carrying drums and transfer pinions, the provision of a return to zero mechanism for the partial totalizer, hand-operable means controlling same, a coil adapted to rock round its axis, means feeding the coil with the pulses, a permanent field extending in a direction perpendicular to the coil axis to produce an oscillation of the coil in a predetermined direction, an elastic force returning the coil into its starting position after each pulse, a pivoting anchor, a tail piece rigid with said anchor and provided with an arcuate series of teeth coaxial with the pivot of the anchor, a toothed wheel coaxially rigid with the coil and meshing with said teeth on the tail piece, two catches controlled by the successive rocking movements in both directions of the anchor under the action of the rocking of the coil, two ratchet wheels controlled by said catches respectively, interengaging toothed wheels coaxially rigid with the corresponding ratchet wheels, a gearing operatively connecting one of said interengaging wheels with the totalizers, a spindle controlled by said gearing, a rotary switch for the circuit feeding the coil and including a conductive drum inserted in the circuit feeding the coil and coaxially rigid with the last mentioned spindle, a plurality of uniformly distributed insulating segments extending longitudinally along a fraction of the periphery of the drum near one end thereof, a brush frictionally engaging the periphery of the drum to cooperate with said insulating sections and conductive sections of the drum therebetween and adapted to break the circuit of said coil during each returning movement of the coil under the action of the elastic force.

6. In an instrument totalizing telephone fees through pulses arriving at a rhythm of 16 kilocycles comprising a general totalizer and a partial totalizer each including a plurality of digit-carrying drums and transfer-pinions, the provision of a return to zero mechanism for the partial totalizer, hand-operable means controlling same, a coil adapted to rock round its axis, constituted solely by rigid convolutions and a spindle to which said convolutions are rigidly secured and extending along the coil axis, means feeding the coil with the pulse, a permanent field extending in a direction perpendicular to the coil axis to produce an oscillation of the coil in a predetermined direction, an elastic force returning the coil into its starting position after each pulse, a pivoting anchor, a tail piece rigid with said anchor and provided with an arcuate series of teeth coaxial with the pivot of the anchor, a toothed wheel coaxially rigid with the coil and meshing with said teeth on the tail piece, two catches controlled by the successive rocking in both directions of the anchor under the action of the rocking of the coil, ratchet wheels controlled by said catches respectively, interengaging toothed wheels coaxially rigid with the corresponding ratchet wheels, and a gearing operatively connecting one of said interengaging wheels with the totalizers.

References Cited in the file of this patent

UNITED STATES PATENTS

| 2,151,086 | Dietrich et al. | Mar. 21, 1939 |
| 2,228,462 | Kienzle | Jan. 14, 1941 |

FOREIGN PATENTS

| 28,777 | Austria | June 10, 1907 |